US011567906B2

(12) United States Patent
Potharaju et al.

(10) Patent No.: US 11,567,906 B2
(45) Date of Patent: Jan. 31, 2023

(54) GENERATION AND TRAVERSAL OF A HIERARCHICAL INDEX STRUCTURE FOR EFFICIENT DATA RETRIEVAL

(71) Applicant: Microsoft Technology Licensing, LLC, Redmond, WA (US)

(72) Inventors: Rahul Potharaju, Redmond, WA (US); Terry Y. Kim, Bellevue, WA (US); Wentao Wu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 247 days.

(21) Appl. No.: 16/856,600

(22) Filed: Apr. 23, 2020

(65) Prior Publication Data

US 2021/0334242 A1 Oct. 28, 2021

(51) Int. Cl.
*G06F 16/00* (2019.01)
*G06F 16/185* (2019.01)
(Continued)

(52) U.S. Cl.
CPC .......... *G06F 16/185* (2019.01); *G06F 16/134* (2019.01); *G06F 16/144* (2019.01);
(Continued)

(58) Field of Classification Search
CPC .... G06F 16/185; G06F 16/134; G06F 16/144; G06F 16/156; G06F 16/1734; G06F 16/182
See application file for complete search history.

(56) References Cited

U.S. PATENT DOCUMENTS

| 7,702,640 B1 * | 4/2010 | Vermeulen | .......... G06F 16/2246 |
| | | | 707/999.1 |
| 2013/0103389 A1 * | 4/2013 | Gattani | ................. G06F 16/353 |
| | | | 704/9 |

(Continued)

OTHER PUBLICATIONS

Lemire, et al., "Roaring bitmaps: Implementation of an optimized software library", In Journal of Software: Practice and Experience., Apr. 2018, pp. 1-34.

(Continued)

*Primary Examiner* — Ashish Thomas
*Assistant Examiner* — Suman Rajaputra
(74) *Attorney, Agent, or Firm* — Fiala & Weaver P.L.L.C.

(57) ABSTRACT

Methods, systems, apparatuses, and computer program products are described herein for the generation and traversal of a hierarchical index structure. The structure indexes search keys from data ingested from different data sources and enables efficient retrieval of the keys. As data is ingested, index nodes are generated at the lowest level of the structure. The nodes are analyzed to determine whether such nodes comprise duplicate keys. Responsive to doing so, a new index node is generated located at a higher level of the structure. This process results in a DAG comprising orphan nodes including different search keys. When processing a query for search keys, the orphan index nodes are initially analyzed for the keys. Upon finding a search key, its child nodes are recursively searched until location information specifying the location of ingested data in which the search key is located is found.

20 Claims, 7 Drawing Sheets

(51) Int. Cl.
*G06F 16/182* (2019.01)
*G06F 16/17* (2019.01)
*G06F 16/14* (2019.01)
*G06F 16/13* (2019.01)

(52) U.S. Cl.
CPC ........ *G06F 16/156* (2019.01); *G06F 16/1734* (2019.01); *G06F 16/182* (2019.01)

(56) References Cited

U.S. PATENT DOCUMENTS

| 2017/0212680 A1* | 7/2017 | Waghulde | G06F 3/0644 |
| 2018/0218055 A1* | 8/2018 | Franz | G06F 16/245 |
| 2021/0117232 A1* | 4/2021 | Sriharsha | G06F 16/256 |

OTHER PUBLICATIONS

Lemire, et al., "Sorting improves word-aligned bitmap indexes", In Journal of Data & Knowledge Engineering, vol. 69, Issue 1, Jan. 1, 2010, pp. 1-43.
Levandoski, et al., "Deuteronomy: Transaction Support for Cloud Data", In Proceedings of the Fifth Biennial Conference on Innovative Data Systems Research, Jan. 9, 2011, pp. 123-133.
Mai, et al., "Chi: a scalable and programmable control plane for distributed stream processing systems", In Proceedings of the VLDB Endowment, vol. 11, Issue 10, Jun. 1, 2018, pp. 1303-1316.
Mai, et al., "NetAgg: Using Middleboxes for Application-specific On-path Aggregation in Data Centres", In Proceedings of the 10th ACM International on Conference on emerging Networking Experiments and Technologies, Dec. 2, 2014, pp. 249-261.
Mavlyutov, et al., "Dependency-Driven Analytics: a Compass for Uncharted Data Oceans", In Proceedings of 8th Biennial Conference on Innovative Data Systems Research, Jan. 8, 2017, 9 Pages.
Merkle, Ralph C., "A digital signature based on a conventional encryption function", In Proceedings of the International Cryptology Conference (CRYPTO), Aug. 16, 1987, pp. 369-378.
Mohammadi, et al., "Deep learning for iot big data and streaming analytics: A survey.", In Journal of IEEE Communications Surveys & Tutorials, vol. 20, Issue 4, Jun. 6, 2018, pp. 1-40.
ONeil, et al., "The log-structured merge-tree (LSM-tree)", In Journal of Acta Informatica, vol. 33, Issue 4, Jun. 1996, pp. 1-32.
Oki, et al., "Viewstamped replication: A new primary copy method to support highly-available distributed systems", In Proceedings of Seventh Annual ACM Symposium on Principles of Distributed Computing, Aug. 15, 1988, pp. 8-17.
Pavlo, et al., "Self-driving database management systems", In Proceedings of 8th Biennial Conference on Innovative Data Systems Research, Jan. 8, 2017, 6 Pages.
Ramakrishnan, et al., "Azure Data Lake Store: A Hyperscale Distributed File Service for Big Data Analytics", In Proceedings of the ACM International Conference on Management of Data, May 14, 2017, pp. 51-63.
Ramakrishnan, et al., "Database management systems (3. ed.)", In Publication of McGraw-Hill, 2003,1098 Pages.
Renesse, et al., "Chain replication for supporting high throughput and availability", In Proceedings of the 6th conference on Symposium on Opearting Systems Design & Implementation—vol. 6, Dec. 6, 2004, 14 Pages.
Samet, Hanan, "Hierarchical spatial data structures", In Symposium on Large Spatial Databases, Jul. 17, 1989, pp. 193-212.
Selinger, et al., "Access path selection in a relational database management system", In Proceedings of the ACM SIGMOD international conference on Management of data, May 30, 1979, pp. 23-34.
Shvachko, et al., "The hadoop distributed file system", In Proceedings of IEEE 26th symposium on mass storage systems and technologies, May 3, 2010, pp. 1-10.
Toshniwal, et al., "Storm@ twitter", In Proceedings of the ACM SIGMOD international conference on Management of data, Jun. 22, 2014, pp. 147-156.
Verbitski, et al., "Amazon aurora: Design considerations for high throughput cloud-native relational databases", In Proceedings of the ACM International Conference on Management of Data, May 14, 2017, pp. 1041-1052.
Zaharia, et al., "Discretized Streams: Fault-Tolerant Streaming Computation at Scale", In Proceedings of the Twenty-Fourth ACM Symposium on Operating Systems Principles, Nov. 3, 2013, pp. 423-438.
"Apache spark", Retrieved from: https://github.com/apache/spark, Retrieved on: Feb. 26, 2020, 7 Pages.
"Azure Synapse Analytics", Retrieved from: https://docs.microsoft.com/en-us/azure/sql-data-warehouse/, Retrieved on: Feb. 26, 2020, 4 Pages.
"Event Hubs", Retrieved from: https://azure.microsoft.com/en-us/services/event-hubs/, Retrieved on: Feb. 26, 2020, 7 Pages.
How Much Does 1 Hour of Downtime Cost the Average Business?, Retrieved from: https://goo.gl/fqqvTW, Retrieved on: Feb. 26, 2020, 7 Pages.
"Questioning the lambda architecture", Retrieved from: https://www.oreilly.com/radar/questioning-the-lambda-architecture/, Retrieved Date: Feb. 26, 2020, 15 Pages.
"Rotating devops role improves engineering service quality", Retrieved from: https://goo.gl/x63caG, Mar. 6, 2017, pp. 1-5.
"Safeguard individual privacy with cloud services from Microsoft", Retrieved from: https://www.microsoft.com/en-us/trust-center/privacy/gdpr-overview, Published Date: Mar. 6, 2017, 4 Pages.
"Site reliability engineering", Retrieved from: https://goo.gl/YwqcQL, Retrieved Date: Feb. 26, 2020, 4 Pages.
"What will we do when the world's data hits 163 zettabytes in 2025?", Retrieved from: https://www.itechdude.com/itech/cloud-computing/what-will-we-do-when-the-world-s-data-hits-163-zettabytes-in-2025, Apr. 13, 2017, 4 Pages.
Abadi, et al., "Aurora: a new model and architecture for data stream management", In International Journal on Very Large Data Bases, vol. 12 Issue 2, Aug. 2003, pp. 120-139.
Agrawal, et al., "Automated selection of materialized views and indexes in SQL databases", In Proceedings of the 26th International Conference on Very Large Data Bases, Sep. 10, 2000, pp. 496-505.
Agrawal, et al., "Integrating Vertical and Horizontal Partitioning into Automated Physical Database Design", In Proceedings of the ACM SIGMOD international conference on Management of data, Jun. 13, 2004, pp. 359-370.
Aiyer, et al., "Storage infrastructure behind Facebook messages: Using HBase at scale", In Journal of IEEE Data Engineering Bulletin, vol. 35, Issue 2, Jun. 2012, pp. 1-10.
Akidau, et al., "MillWheel: Fault-Tolerant Stream Processing at Internet Scale", In Proceedings of the VLDB Endowment, vol. 6, Issue 11, Aug. 2013, pp. 1033-1044.
Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, Issue 12, Aug. 2015, pp. 1792-1803.
Armbrust, et al., "Spark SQL: Relational Data Processing in Spark", In Proceedings of the ACM SIGMOD International Conference on Management of Data, May 31, 2015, pp. 1383-1394.
Armbrust, et al., "Structured streaming: A declarative api for real-time applications in apache spark", In Proceedings of the International Conference on Management of Data, Jun. 10, 2018, pp. 601-613.
Assuncao, et al., "Distributed data stream processing and edge computing: A survey on resource elasticity and future directions", In Journal of Network and Computer Applications, vol. 103, Feb. 1, 2018, pp. 1-24.
Bailis, et al., "Demonstration: MacroBase, A Fast Data Analysis Engine", In Proceedings of the 2017 ACM International Conference on Management of Data, May 14, 2017, pp. 1699-1702.
Baker, et al., "Megastore: Providing Scalable, Highly Available Storage for Interactive Services", In proceedings of 5th Biennial Conference on Innovative Data Systems Research, Jan. 9, 2011, pp. 223-234.

(56) References Cited

OTHER PUBLICATIONS

Bernstein, et al., "Hyder-A Transactional Record Manager for Shared Flash", In Proceedings of 5th Biennial Conference on Innovative Data Systems Research, Jan. 9, 2011, pp. 9-20.

Bingmann, et al., "Thrill: High-Performance Algorithmic Distributed Batch Data Processing with C++", In Proceedings of IEEE International Conference on Big Data, Dec. 5, 2016, 15 Pages.

Bykov, et al., "Orleans: cloud computing for everyone", In Proceedings of the 2nd ACM Symposium on Cloud Computing, Oct. 27, 2011, 14 Pages.

Calder, et al., "Windows Azure Storage: A Highly Available Cloud Storage Service with Strong Consistency", In Proceedings of the Twenty-Third ACM Symposium on Operating Systems Principles, Oct. 23, 2011, 26 Pages.

Carbone, et al., "Apache flink™: Stream and batch processing in a single engine", In Bulletin of the IEEE Computer Society Technical Committee on Data Engineering vol. 36, No. 4, Jan. 2015, pp. 28-38.

Chaiken, et al., "SCOPE: easy and efficient parallel processing of massive data sets", In Proceedings of VLDB Endowment, vol. 1, Issue 2, Aug. 23, 2008, 1265-1276.

Chandramouli, et al., "Quill: Efficient, transferable, and rich analytics at scale", In Proceedings of the VLDB Endowment, vol. 9, Issue 14, Oct. 2016, pp. 1623-1634.

Chandramouli, et al., "Trill: A high-performance incremental query processor for diverse analytics", In Proceedings of the VLDB Endowment vol. 8, Issue 4, Dec. 2014, pp. 401-412.

Chang, et al., "Bigtable: A Distributed Storage System for Structured Data", In Journal of ACM Transactions on Computer Systems, vol. 26, Issue 2, Jun. 2008, 26 Pages.

Chao, Mt., "A general purpose unequal probability sampling plan", In Journal of Biometrika, vol. 69, Issue 3, Dec. 1, 1982, pp. 653-656.

Chaudhuri, et al., "An Efficient Cost-Driven Index Selection Tool for Microsoft SQL Server", In Proceedings of the 23rd International Conference on Very Large Data Bases, Aug. 25, 1997, pp. 146-155.

Chen, et al., "Failure Diagnosis Using Decision Trees", In Proceedings of International Conference on Autonomic Computing, May 17, 2004, 8 Pages.

Cheng, et al., "A survey on algorithms for mining frequent item sets over data streams", In Journal of Knowledge and Information Systems, Jul. 1, 2008, 27 Pages.

Comer, Douglas, "The Ubiquitous B-Tree", In Computing Surveys, vol. 11, Issue 2, Jun. 1979, pp. 121-137.

Cooper, et al., "PNUTS: Yahoo!'s Hosted Data Serving Platform", In Proceedings of the VLDB Endowment, Aug. 24, 2008, 12 Pages.

Cormode, et al., "Exponentially decayed aggregates on data streams", In Proceedings of IEEE 24th International Conference on Data Engineering, Apr. 7, 2008, 3 Pages.

Cormode, et al., "Synopses for Massive Data: Samples, Histograms, Wavelets, Sketches", In Journal of Foundations and Trends in Databases, vol. 4, No. 1-3, Jan. 1, 2012, 296 Pages.

Decandia, et al., "Dynamo: Amazon's Highly Available Key-value Store", In Proceedings of twenty-first ACM SIGOPS symposium on Operating systems principles, Oct. 14, 2007, pp. 205-220.

Dewitt, et al., "Split Query Processing in Polybase", In Proceedings of the ACM SIGMOD International Conference on Management of Data, Jun. 22, 2013, 12 Pages.

Dewitt, David J., "The Gamma Database Machine Project", In Journal of Transactions on Knowledge and Data Engineering, vol. 2, Issue 1, Mar. 1990, 38 Pages.

Diaconu, et al., "Hekaton: SQL server's memory-optimized OLTP engine", In Proceedings of the ACM SIGMOD International Conference on Management of Data, Jun. 22, 2013, pp. 1243-1254.

Ghemawat, et al., "The Google File System", In Proceedings of the 19th ACM SIGOPS Operating Systems review, vol. 37, Issue 5, Oct. 19, 2003, pp. 29-43.

Guttman, Antonin, "R-Trees: A Dynamic Index Structure for Spatial Searching", In Proceedings of Conference on Management of Data, 1984, pp. 47-57.

Hellerstein, et al., "Generalized search trees for database systems", In Proceedings of the 21th International Conference on Very Large Data Bases, Sep. 1995, pp. 562-573.

Kornacker, et al., "Concurrency and recovery in generalized search trees", In Journal of ACM SIGMOD Record, vol. 26, Issue 2, Jun. 1, 1997, pp. 62-72.

Kraska, et al., "The Case for Learned Index Structures", In Proceedings of the International Conference on Management of Data, Jun. 10, 2018, pp. 489-504.

Kreps, et al., "Kafka: a Distributed Messaging System for Log Processing", In Proceedings of 6th International Workshop on Networking Meets Databases (NetDB), Co-located with SIGMOD 2011, Jun. 12, 2011, 7 pages.

Lakshman, et al., "Cassandra: A Decentralized Structured Storage System", In Journal of ACM SIGOPS Operating Systems Review, vol. 44, Issue 2, Apr. 14, 2010, 6 Pages.

Lamport, Leslie, "Paxos Made Simple", In Journal of ACM Sigact News, vol. 32, Issue 4, Dec. 2001, 14 Pages.

Lamport, Leslie, "The Part-Time Parliament", In Journal of ACM Transactions on Computer Systems, vol. 16, Issue 2, May 1998, 33 Pages.

\* cited by examiner

GENERATION AND TRAVERSAL OF A HIERARCHICAL INDEX STRUCTURE FOR EFFICIENT DATA RETRIEVAL

BACKGROUND

It is estimated that the amount of data worldwide will grow from 0.8 to 164 Zettabytes this decade. As an example, Microsoft's Azure® Data Lake Store (a scalable data storage and analytics service) already holds many exabytes and is growing rapidly. Users seek ways to focus on the finer details they really need, but without getting rid of the original data. This is a non-trivial challenge because a single dataset can be used for answering a multitude of questions. As an example, telemetry (e.g., logs, heartbeat information) from various services are stored and analyzed to support a variety of developer tasks (e.g., monitoring, reporting, debugging). With the monetary cost of downtime ranging from $100k to millions of dollars per hour, real-time processing and querying of this service data becomes critical.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are directed to the generation and traversal of a hierarchical index structure. The hierarchical index structure indexes search keys from data received and stored (i.e., ingested) from a plurality of different data sources and enables efficient retrieval of the search keys. When data is ingested, a plurality of index nodes are generated at the lowest level of the hierarchical index structure. The index nodes are analyzed to determine whether such nodes comprise duplicate keys. In the event that such index nodes comprise duplicate search keys, a new index node is generated that is located at a higher level of the hierarchical index structure. The new index node references (or points to) the index nodes that included the duplicate search keys. This process continues as higher and higher levels of index nodes are generated, each comprising the duplicate search keys of index nodes located at the level below. The foregoing index generation process results in a directed acyclic graph (DAG) comprising a plurality of orphan nodes including different search keys. When processing a query for search keys, the orphan index nodes are initially analyzed for the search keys. In the event that an orphan index node comprises the search keys, its child nodes are recursively searched until location information specifying the location of ingested data in which the search key is located is found. The foregoing techniques advantageously limit the number of index nodes that are required to be searched, thereby greatly increasing the speed at which query results are returned (i.e., the read access time is greatly decreased), while also limiting the processing cycles required to find and return such search keys.

The hierarchical index structure is generated asynchronously with respect to data ingestion. Accordingly, new data can continue to be ingested while already-ingested data can be indexed via the hierarchical index structure. This advantageously decreases the write time for storing incoming data to the underlying file system. To enable a consistent view of the underlying data, the techniques described herein enable a hybrid search that queries both the index nodes of the hierarchical index structure and the newly-ingested data that has not yet been indexed for search keys. This advantageously returns the latest view of the underlying dataset (i.e., the user is not returned stale or outdated data) if needed.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further explain the principles of the embodiments and to enable a person skilled in the relevant art(s) to make and use the embodiments.

Figure 8:
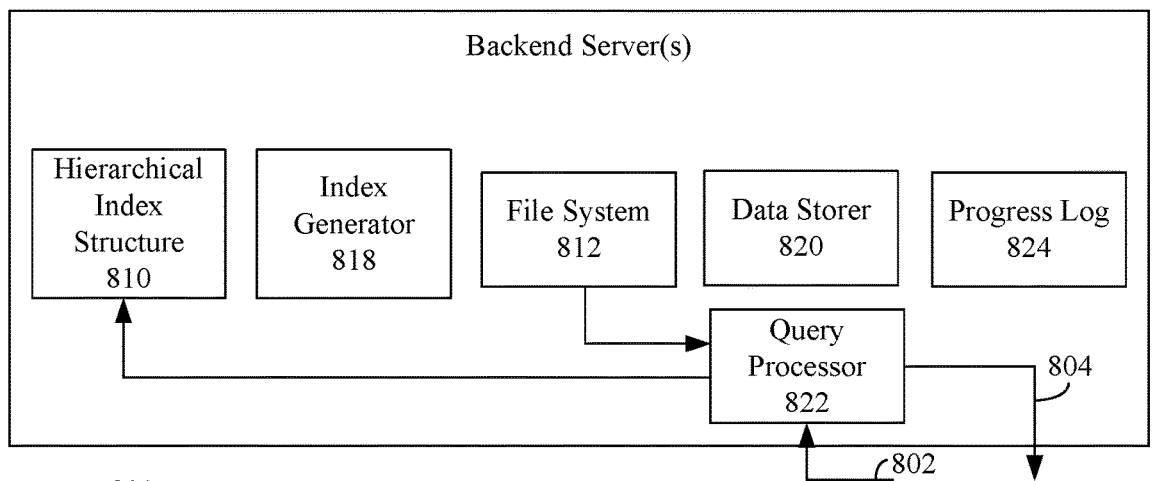

FIG. 8 a block diagram of backend server(s) configured to traverse a hierarchical index structure to locate search keys in accordance with an example embodiment.

Figure 9:
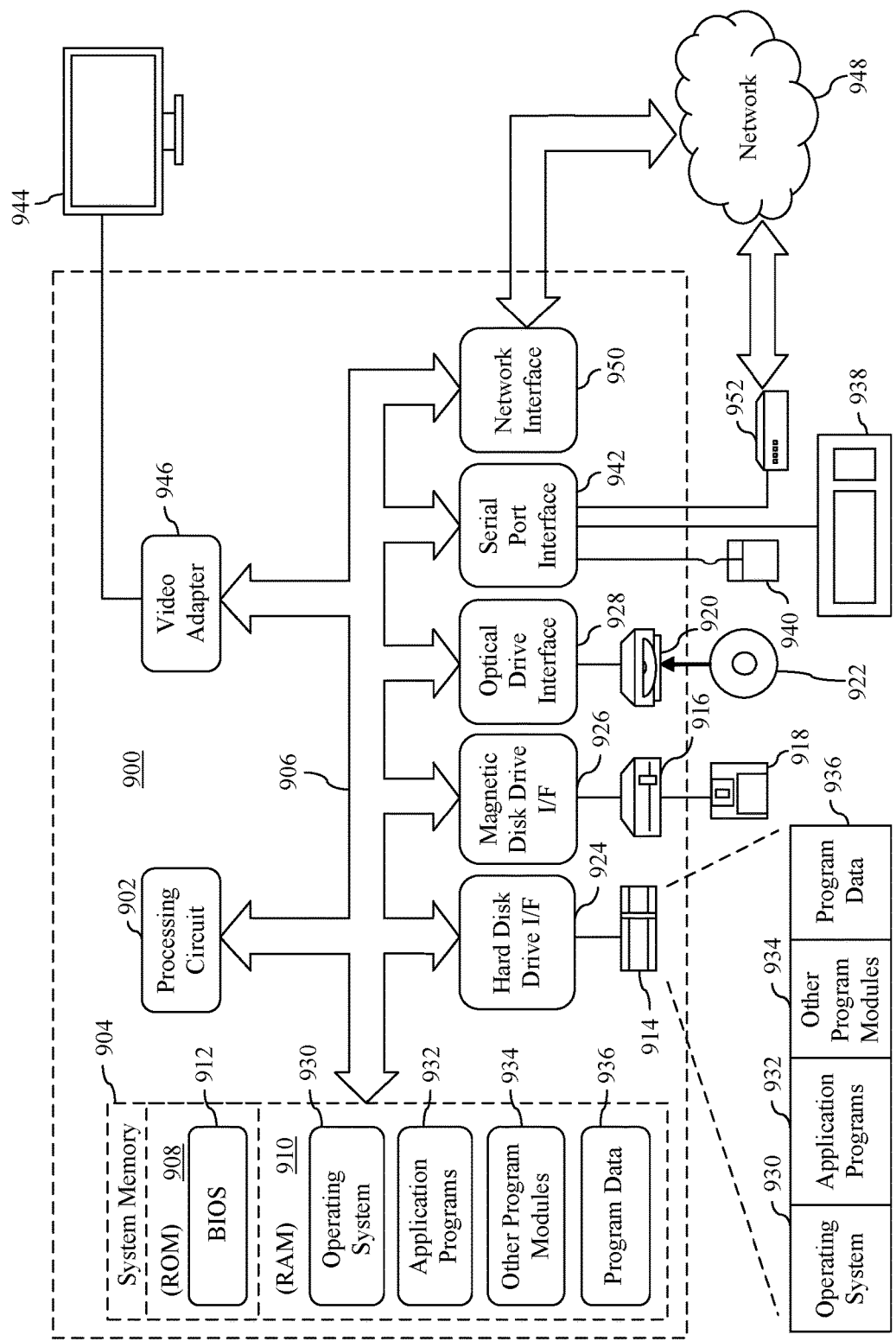

FIG. 9 is a block diagram of an example processor-based computer system that may be used to implement various embodiments.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Embodiments described herein are directed to the generation and traversal of a hierarchical index structure. The hierarchical index structure indexes search keys from data received and stored (i.e., ingested) from a plurality of different data sources and enables efficient retrieval of the search keys. When data is ingested, a plurality of index nodes are generated at the lowest level of the hierarchical index structure. The index nodes are analyzed to determine whether such nodes comprise duplicate keys. In the event that such index nodes comprise duplicate search keys, a new index node is generated that is located at a higher level of the hierarchical index structure. The new index node references (or points to) the index nodes that included the duplicate search keys. This process continues as higher and higher levels of index nodes are generated, each comprising the duplicate search keys of index nodes located at the level below. The foregoing index generation process results in a directed acyclic graph (DAG) comprising a plurality of orphan nodes including different search keys. When processing a query for search keys, the orphan index nodes are initially analyzed for the search keys. In the event that an orphan index node comprises the search keys, its child nodes are recursively searched until location information specifying the location of ingested data in which the search key is located is found. The foregoing techniques advantageously limit the number of index nodes that are required to be searched, thereby greatly increasing the speed at which query results are returned (i.e., the read access time is greatly decreased), while also limiting the processing cycles required to find and return such search keys.

The hierarchical index structure is generated asynchronously with respect to data ingestion. Accordingly, new data can continue to be ingested while already-ingested data can be indexed via the hierarchical index structure. This advantageously decreases the write time for storing incoming data to the underlying file system. To enable a consistent view of the underlying data, the techniques described herein enable a hybrid search that queries both the index nodes of the hierarchical index structure and the newly-ingested data that has not yet been indexed for search keys. This advantageously returns the latest view of the underlying dataset (i.e., the user is not returned stale or outdated data) if needed.

II. Example Embodiments

Figure 1:
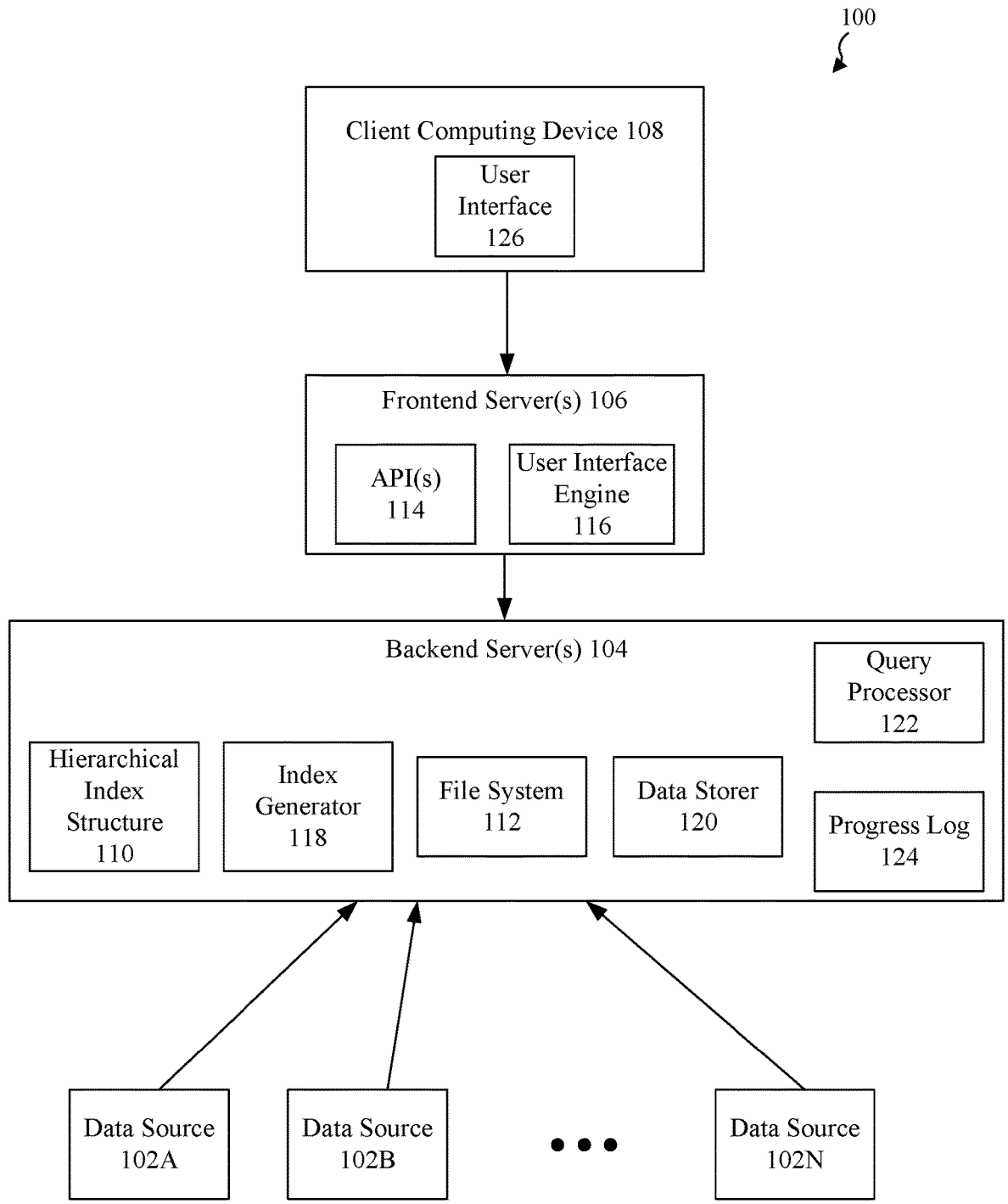
FIG. 1 is a block diagram of system for data ingestion and indexing in accordance with an example embodiment.

FIG. 1 is a block diagram of a computing system 100 for data ingestion and indexing in accordance with an example embodiment. As shown in FIG. 1, system 100 comprises data sources 102A-102N, one or more backend servers 104, one or more frontend servers 106, and a client computing device 108. Each of data sources 102A-102N is configured to generate and provide data to backend server(s) 104. The data may comprise any type of information, including, but not limited to, diagnostic information (e.g., log files, heartbeat information, etc.), demographic information (e.g., age, gender, location, etc.) associated with any number of users, a usage history associated with one or more devices and/or software applications associated with each of the plurality of users, purchase activity associated with each of the plurality of users (e.g., device purchases, software application purchases, etc.), advertising campaigns associated with each of the plurality of users (e.g., advertisements that have been targeted to each of the plurality of users, advertisements that have been interacted with (e.g., viewed, clicked on, etc.) by each of the plurality of users, logs generated by applications executed thereon, etc. Examples of data sources 102A-102N include, but are not limited, a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), a stationary computing device such as a desktop computer or PC (personal computer) or a server, Internet-of-Things (IoT) devices, a database server, a server located in a cloud services platform (also referred to as a node or compute), etc.

Backend server(s) 104 (also referred to as "ingestion" servers) are configured to receive and store (i.e., ingest) the data received from data sources 102A-102N into a file system 112. For example, backend server(s) 104 comprise a data storer 120 that receives data from data sources 102A-102N and stores the data in a file system 112 maintained by backend server(s) 104. File system 112 stores the received data as tables of records. A group of one or more records is referred to as a data block. Each data block is associated with a handle (e.g., a uniform resource identifier (URI)) that can be used to efficiently retrieve the data block. Data records may be grouped in uniform fashion, by using fixed-size (e.g., 100 records per data block) or fixed-time (e.g., a new data block every 1 minute) policies, although the embodiments described herein are not so limited. In accordance with an embodiment, file system 112 is a file system that is distributed among various ones of backend server(s) 104 (i.e., file system 112 is a distributed file system). Examples of distributed file systems include, but are not limited to Azure® Data Lake owned by Microsoft® Corporation of Redmond, Wash., Azure® Blob Storage owned by Microsoft® Corporation of Redmond, Wash., etc.

Backend server(s) 104 are further configured to generate and maintain an index of the data blocks stored in file system 112. For example, backend server(s) 104 comprise an index generator 118 that generates the index. The index is implemented as a hierarchical index structure 110. Hierarchical index structure 110 is a global index that is distributed between various ones of backend server(s) 104 (i.e., hierarchical index structure 110 is a distributed global index). Backend server(s) 104 may be co-located in the same datacenter, but within different fault-tolerance domains. This ensures that backend sever(s) 104 have fast access to the underlying data and also increases availability and reliability.

Hierarchical index structure 110 comprises a plurality of index nodes arranged in a hierarchical fashion. Index nodes located at a higher level of hierarchical index structure 110 may reference index nodes located at a lower level of hierarchical index structure 110. Every level above the leaf index nodes act as an index layer that indexes into the layer beneath. Each index node comprises one or more search keys that have been indexed from one or more data blocks stored in file system 112. Index nodes may comprise location information (e.g., pointers), which specifies a location of data blocks from which corresponding search key(s) are retrievable. Accordingly, the content of an index node may be presented as a collection of pairs <K,P>, where K is a search key and P is a set of pointers that may contain information pertaining to the search key. In accordance with an embodiment, the location information comprises a pointer to a path to one or more files located in file system 112 that store the data block comprising the search key. In accordance with another embodiment, the location information comprises a pointer to offsets inside the file(s) located in file system 112 that locate addressable data blocks comprising the search key.

Progress log 124 keeps track of the data blocks that have been stored in file system 112, but have not yet been indexed. For instance, after data blocks are stored in file system 112, data storer 120 writes to progress log 124 an indication of the data blocks that have been stored in file system 112 and location information that specifies the location at which the data blocks are stored in file system 112. Progress log 124 also keeps track of the data blocks that have been indexed. For instance, after index blocks are generated, index generator 118 writes to progress log 124 an indication of the index blocks that have been generated and the data blocks referenced thereby. Any data block that is identified as being stored in file system 114 in progress log 124, but is not referenced by an index block are identified as data blocks for which data has not yet been indexed. Accordingly, progress log 124 tracks the progress of both data that has been ingested and stored in file system 114 and data that has been indexed via hierarchical index structure 112. Progress log 124 may identify the index nodes generated at a level-by-level basis. This effectively creates a watermark that records the latest data block being ingested, stored, and indexed at a particular level. As will be described below with reference to Subsection B, progress log 124 may be utilized to perform a hybrid query, which searches for search keys in both index nodes and the data blocks that have not yet been indexed.

Backend server(s) 104 may partition hierarchical index structure 110 into different partitions. Indexed data may be distributed to different partitions by hashing on a user-specified partitioning key (e.g., a username, a date, etc.) or simply using round-robin distribution if no key is specified. Each partition may fall into its own reliability zone, with multiple replicas to ensure fault tolerance and improve availability. Hierarchical index structure 110 allows for efficient ingestion and organization of extremely large datasets at a cost-efficient manner. Additional details regarding hierarchical index structure 110 are described below in Subsection A.

Frontend server(s) 106 are configured to act as a frontend gateway that is responsible for authenticating and authorizing users to enable such users to query hierarchical index structure 110. As shown in FIG. 1, frontend server(s) 106 expose a set of one or more API(s) 114 and comprises a user interface engine 116. API(s) 114 may be utilized to perform search queries for reading data maintained by file system 114 and indexed by hierarchical index structure 112. In one implementation, such APIs 114 may include Representational stat REST APIs, although this is only a non-limiting example.

Queries may be initiated via a user interface 126 rendered on a display device of client computing device 108. User interface 126 may be rendered via user interface engine 116. Using user interface 126, a user is enabled to formulate and transmit queries to frontend server(s) 106. Frontend server(s) 106 utilize API(s) 114 to issue search queries to backend server(s) 104. Responsive to receiving search queries, a query processor 122 of backend server(s) 104 traverses hierarchical index structure 110 for index nodes comprising search keys that are specified by the search queries in a "move right" and "move down" fashion. The location information included in such index nodes is utilized to retrieve data records comprising the search key from corresponding data blocks stored via file system 112. Additional details regarding hierarchical index structure 110 traversal techniques are described below with reference to Subsection B. Query processor 122 returns the determined data records to frontend server(s) 106. API(s) 114 return the determined data records via a response to the search query. The determined data records are displayed to the user via user interface 126.

In accordance with at least one embodiment, data sources 102A-102N, backend server(s) 104 and/or frontend server(s) 106 comprise part of a cloud services platform (e.g., data sources 102A-102N, backend server(s) 104 and/or frontend server(s) 106 are nodes of a cloud services platform. An example of a cloud services platform includes, but is not limited to, the Microsoft® Azure® cloud computing platform, owned by Microsoft Corporation of Redmond, Wash.

A. Hierarchical Index Structure Generation

Figure 2A:
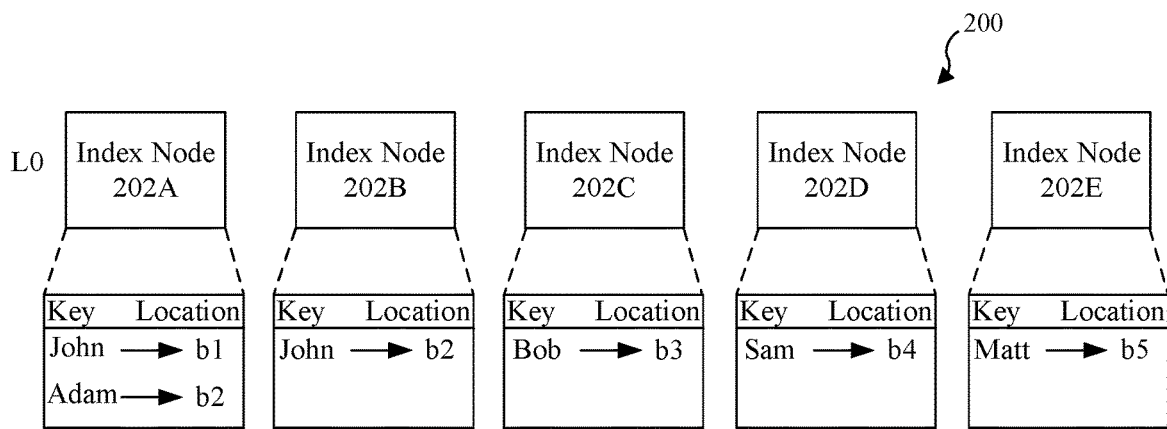
FIGS. 2A-2C depict the generation of a hierarchical index structure in accordance with an example embodiment.
Figure 2B:
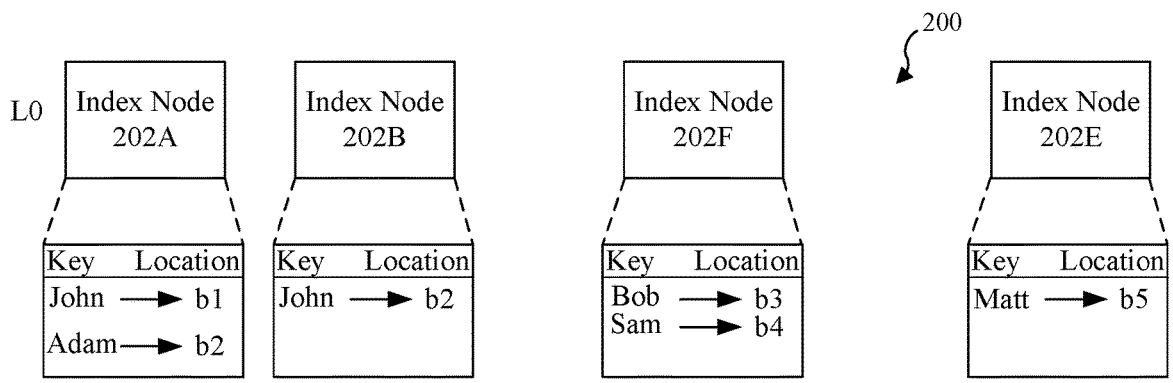
Figure 2C:
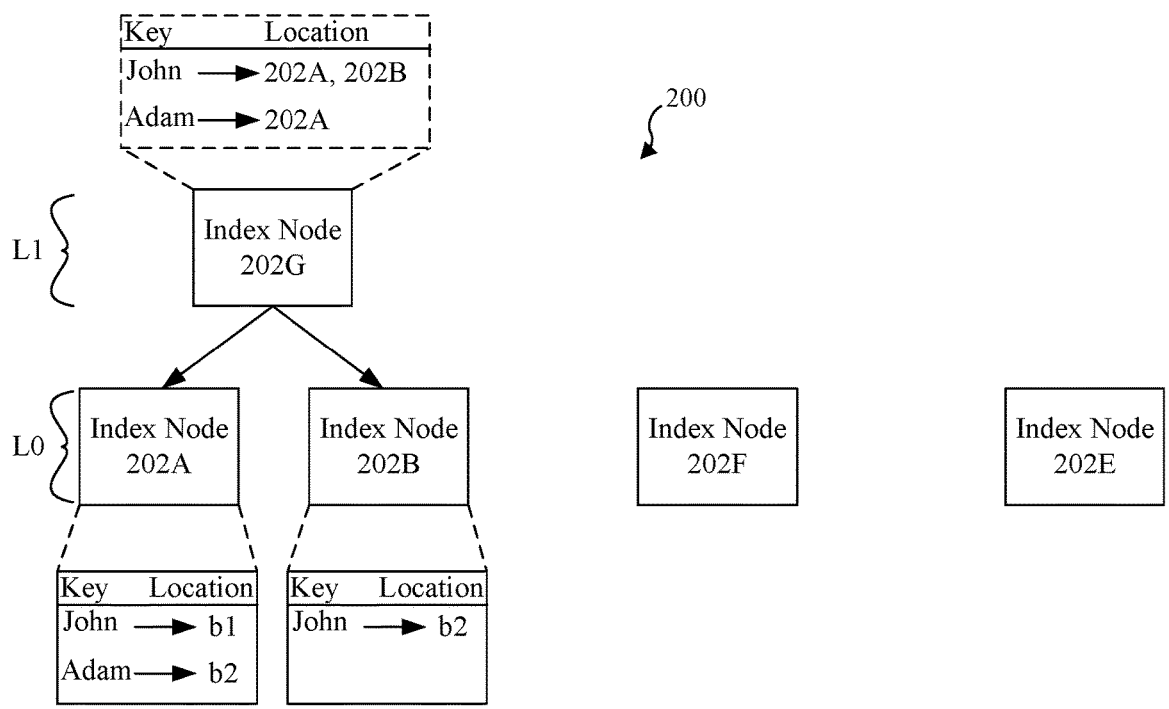

FIGS. 2A-2C depict the generation of a hierarchical index structure 200 in accordance with an example embodiment. Hierarchical index structure 200 is generated by index generator 118, as described above with reference to FIG. 1. Hierarchical index structure 200 is an example of hierarchical index structure 110, as described above with reference to FIG. 1.

As shown in FIG. 2A, a plurality of leaf index nodes 202A-202E located at the lowest level of hierarchical index structure 200 (referred to as level 0 (or $L_0$)) are generated. Leaf index nodes 202A-202E are generated for each data block stored in file system 112. A fundamental difference with respect to classic tree-based indexes, such as a B-tree, is that no global order is enforced over the leaf nodes. Indexed search keys are stored into leaf index nodes 202A-202E based on the arrival order of the corresponding data received from data sources 102A-102N. Each search key stored by leaf index nodes 202A-202E is associated with location information that identifies the location of the corresponding data (e.g., data records) that comprise the search key. For instance, as shown in FIG. 2, index node 202A comprises search keys "John" and "Adam". Search key "Adam" is paired with location information that specifies that search key is found in data block 1 (b1), and search key "Adam" is paired with location information that specifies that search key is found in data block 2 (b2). Index node 202B comprises search key "John". Search key "John" is paired with location information that specifies that search key is found in data block 2 (b2). Index node 202C comprises search key "Bob". Search key "Bob" is paired with location information that specifies that search key is found in data block 3 (b3). Index node 202D comprises search key "Sam". Search key "Sam" is paired with location information that specifies that search key is found in data block 4 (b4). Index node 202E comprises search key "Matt". Search key "Matt" is paired with location information that specifies that search key is found in data block 5 (d5).

It is noted that the search keys described above are purely exemplary and that each of index nodes 202A-202E may comprise any number of search keys, including thousands or even millions of search keys.

After this initialization stage, any of leaf index nodes 202A-202E may be combined based on size and/or commonality. For instance, if two or more leaf index nodes have a size that is below a predetermined threshold (e.g., 64 MB), the subset of leaf index nodes may be merged (i.e., combined). Such an operation may be referred to as a "merge" operation. For example, as shown in FIG. 2A, index node 202C and index node 202D may each have a size that is below a predetermined threshold. Accordingly, index node 202C and index node 202D may be merged together to form a new index node. For example, as shown in FIG. 2B, index node 202C and index node 202D have been merged together to form index node 202F. Index node 202F comprises the search keys that were previously included in index nodes 202C and 202D (i.e., "Bob" and "Sam"), along with the location information paired with such search keys.

If two or more leaf index nodes comprise a number of duplicate search keys that exceed a predetermined threshold, a higher-level index node (i.e., an index node generated at a level higher at which such leaf index nodes are located) is generated that comprises the union of the search keys of the two or more leaf index nodes. Such an operation may be referred to as an "add" operation. The resulting index node points to each leaf index node of the two or more leaf index nodes, rather than to the locations of the data blocks in which the search keys are located. For example, as shown in FIG. 2B, index node 202A and index node 202B comprise duplicate search keys (i.e., "John"). Accordingly, a new index node is generated at a higher level of hierarchical index structure 200 that comprises the search keys of index nodes 202A and 202B. For example, as shown in FIG. 2C, index node 202G has been generated that comprises the search keys of index nodes 202A and 202B (i.e., "John" and "Adam"). Moreover, search key "John" is associated with (or points to) the index nodes (i.e., index nodes 202A and 202B) that comprise the location information specifying the data blocks where search key "John" is found. Search key "Adam" is associated with the index node (index node 202B) that comprises the location information specifying the data block where search key "Adam" is found. Accordingly, as shown in FIG. 2C, contrary to the "merge" operation described above, index nodes 202A and 202C are retained (i.e., they are not removed) after completion of the "add" operation.

It is noted that the size and commonality-based policies described herein for merging existing index nodes and adding new index nodes are purely exemplary and that other policies (e.g., time-based policies) may be utilized to merge existing index nodes and/or add new index nodes.

Figure 3:
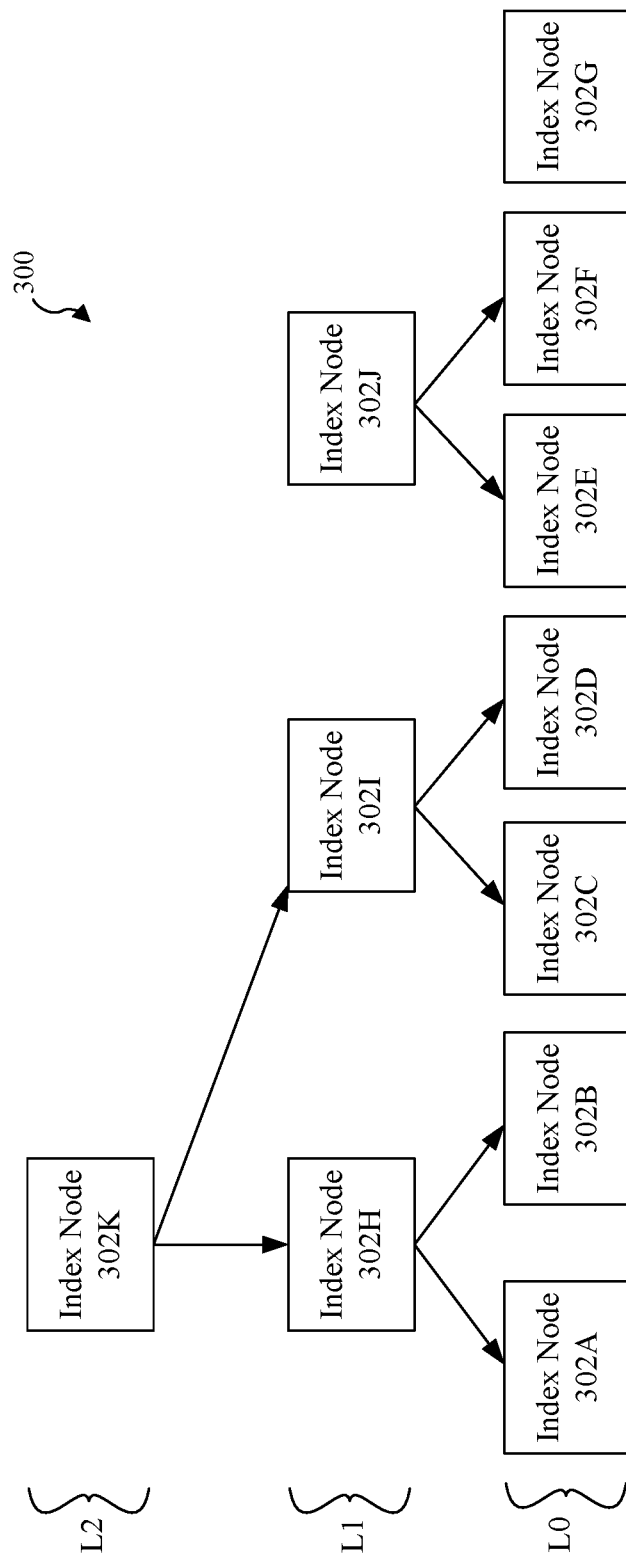
FIG. 3 depicts a hierarchical index structure in accordance with an example embodiment.

Index nodes may be added at higher levels until the size of the resulting node reaches a predetermined threshold. Due to the size-based policies described herein, a non-root index level may contain index nodes that are orphans, i.e., they do not have parent nodes in the next higher level. For example, FIG. 3 depicts a hierarchical index structure 300 comprising a plurality of levels (L0-L2) in accordance with an example embodiment. As shown in FIG. 3, hierarchical index structure 300 comprises a first level (L0) comprising index nodes 302A-302G, a second level (L1) comprising index nodes 302H-302J, and a third level (L2) comprising index node 302K. Add operations have been performed with respect to index nodes 302A and 302B to create index node 302H, with respect to index nodes 302C and 302D to create index node 302I, with respect to index nodes 302E and 302F to create index node 302I, and with respect to index nodes 302H-302I to create index node 302K. Index nodes 302K, 302J, and 302G are considered to be orphan nodes, as they are parentless (i.e., they do not have parents in the next higher level). Accordingly, hierarchical index structure 300 can be generalized to a directed acyclic graph (DAG), rather than a classic tree-like structure.

An issue that may arise via merge and add operations is that the resulting index node may contain many search keys (after taking the union). In particular, this is a critical issue when the search keys are from a large domain consisting of billions (e.g., Job ID, Device ID, etc.) or trillions (e.g., Vertex ID, Task ID, etc.) of search keys. To avoid this phenomenon of cascading explosion, in accordance with an embodiment, instead of directly taking a union over the search keys, a hash function is first applied on the search keys, and the union is taken over the hashed values. Each level of hierarchical index structure 300 may use a different hash function, where the hash function used by a higher level further reduces the key space generated by the hash function used by the previous lower level. For example, as shown in FIG. 3, L1 may utilize a first hash function, and L2 may utilize a second hash function that is different than the first hash function. The first hash function effectively reduces the search keys to a number lower than the search keys represented by the index nodes of the lower level (e.g., L0). The second hash function effectively reduces the search keys even further.

It is noted that the number of levels and number of index nodes included in each level described above with reference to FIGS. 2-3 are purely exemplary and that a hierarchical index structure may comprise any number of levels, where each level may comprise any number of index nodes. It is further noted that that operations other than the add and merge operations may be utilized to construct a hierarchical index structure. For example, in accordance with an embodiment, a "split" operation may be utilized to split an index node into multiple index nodes, where the search keys in the node that is split are partitioned into the multiple index nodes using hash partitioning techniques. The split operation may be useful in situations where the key space is large and index nodes tend to contain many distinct keys. In such cases, the split operation may be applied to index nodes before performing a merge operation or add operation.

As demonstrated above, a hierarchical index structure is constructed in a bottom-up manner. This is different from building classic tree-based indexes, such as B-trees, where data is inserted into the index in a top-down manner. Periodic maintenance of the hierarchical index structure may also be performed, in which the hierarchical index structure is compacted in a bottom-up fashion. For instance, new leaf nodes may be constructed by merging any new index nodes and any old (already-generated) orphan index node that are below a predetermined size threshold. This may trigger adding more nodes at the next higher level, in which an add operation is performed starting from the old orphan index nodes. This procedure is recursive and more index nodes are added level by level until no more add or merge operations can be performed (e.g., due to the inapplicability of the size and/or commonality policies described above).

Figure 4:
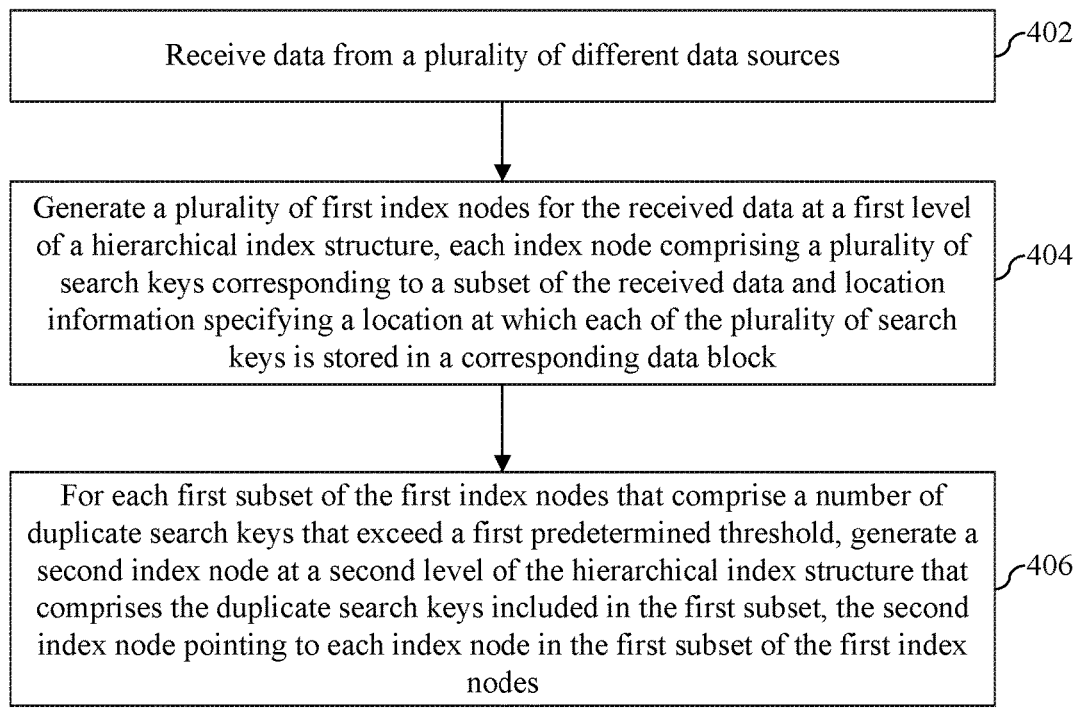
FIG. 4 shows a flowchart of a method for generating a hierarchical index structure in accordance with an example embodiment.
Figure 5:
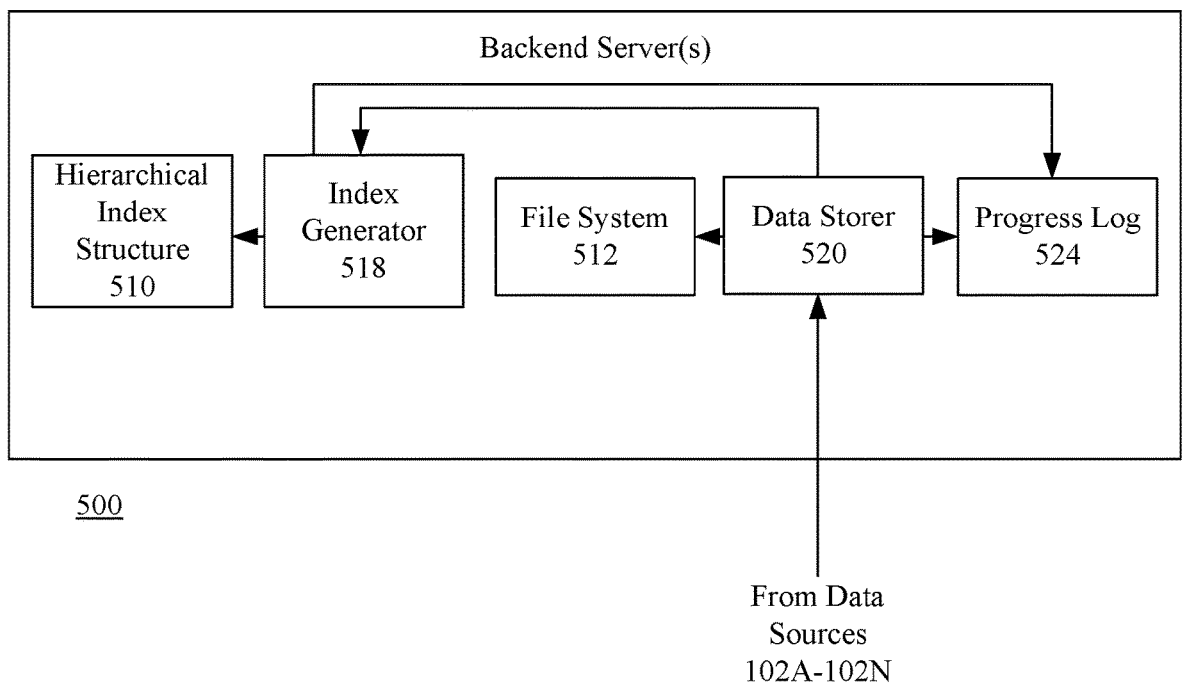
FIG. 5 is a block diagram of backend server(s) configured to generate a hierarchical index structure in accordance with an example embodiment.

Accordingly, a hierarchical index structure for indexing search keys may be generated in many ways. For example, FIG. 4 shows a flowchart 400 of a method for generating a hierarchical index structure, according to an example embodiment. In an embodiment, flowchart 400 may be implemented by backend server(s) 500, as shown in FIG. 5. FIG. 5 is a block diagram of backend server(s) 500, according to an example embodiment. Backend server(s) 500 are examples of backend server(s) 104, as described above with reference to FIG. 1. As shown in FIG. 5, backend server(s) 500 comprises hierarchical index structure 510, index generator 518, file system 512, data storer 520, and progress log 524. Index structure 510, index generator 518, file system 512, data storer 520, and progress log 524 are examples of index structure 110, index generator 118, file system 112, data storer 120, and progress log 124, as described above with reference to FIG. 1. Additional components described above with respect to backend server(s) 104 are not shown in FIG. 5 for sake of brevity. Other structural and operational embodiments will be apparent to persons skilled in the relevant art(s) based on the following discussion regarding flowchart 400 and backend server(s) 500 of FIG. 5.

Flowchart 400 of FIG. 4 begins with step 402. In step 402, data is received from a plurality of different data sources. For example, with reference to FIG. 5, data storer 520 receives data from data sources 102A-102N, as shown in FIG. 1.

In step 404, a plurality of first index nodes for the received data is generated at a first level of a hierarchical index structure. Each index node comprises a plurality of search keys corresponding to a subset of the received data and location information specifying a location at which each of the plurality of search keys is stored in a corresponding data block. For example, with reference to FIG. 5, index generator 518 generates a plurality of first index nodes for the received data at a first level of hierarchical index structure 510. As shown in FIG. 2A, each of index nodes 202A-202E comprise search keys and location information specifying a location at which each of the plurality of search keys is stored in a corresponding data block. As shown in FIG. 5, the data blocks are stored in file system 512 by data storer 520.

In accordance with one or more embodiments, the location information comprises a uniform resource identifier identifying at least one of a path to a file or an offset thereof at which the corresponding data block is stored. For example, with reference to FIG. 5, the location information comprises a uniform resource identifier identifying at least one of a path to a file (or an offset thereof) maintained by file system 512. The file stores the corresponding data block.

In step 406, for each first subset of the first index nodes that comprise a number of duplicate search keys that exceed a first predetermined threshold, a second index node is generated at a second level of the hierarchical index structure that comprises the duplicate search keys included in the first subset. The second index node points to each index node in the first subset of the first index nodes. For example, with reference to FIG. 5, index generator 518, for each first subset of the first index nodes that comprise a number of duplicate search keys that exceed a first predetermined threshold, a second index node is generated at a second level of hierarchical index structure 510 that comprises the duplicate search keys included in the first subset. As shown in FIG. 2C, index generator 518 determines that index nodes 202A and 202B comprise a number of duplicate search keys (e.g., search key "John") that exceed a first predetermined threshold. In response, index generator 518 generates index node 202G at a higher level (i.e., L1) of the hierarchical index structure. Index generator 518 performs a union of the search keys included in index nodes 202A and 202B, and therefore, stores search keys "John" and "Adam". Index node 202G references (i.e., points to) each of index nodes 202A and 202B, and therefore, acts as an index layer to index nodes 202A and 202B.

In accordance with one or more embodiments, a progress log is maintained that stores a first indication of each first index node that has been generated and a second indication of each second index node that has generated. For example, with reference to FIG. 5, index generator 518 writes the first indication of each index node that has been generated and the second indication of each second index node that has been generated to progress log 524.

In accordance with one or more embodiments, the progress log further comprises a third indication of data that has been received but for which a first index node has not yet been generated. For example, with reference to FIG. 5, data storer 520 writes an indication of the data (i.e., data blocks) that have been stored in file system 512 to progress log 524. Any data block specified by progress log 524 for which an index node has not yet been generated is represented by the third indication.

In accordance with one or more embodiment, at least two index nodes of the plurality of first index nodes are merged. For example, with reference to FIG. 2A, index generator may merge index nodes 202C and 202D.

In accordance with one or more embodiments, a determination is made that the at least two index nodes of the plurality of first index nodes have a size below a second predetermined threshold. The at least two index nodes are merged responsive to determining that the at least two index nodes of the plurality of first index nodes have a size below the second predetermined threshold. For example, with reference to FIG. 5, index generator 518 determines that at least two index nodes of the plurality of first index nodes have a size below a second predetermined threshold. With reference to FIG. 2A, index generator 518 determines that index nodes 202C and 202D have sizes that are below a second predetermined threshold (e.g., 64 MB). In response, index generator 518 merges the at least two index nodes. With reference to FIG. 2B, index generator 518 merges index nodes 202C and 202D to generate index node 202F. Index generator 518 takes the union of the search keys and location information and stores search keys and location information of index nodes 202C and 202D in index node 202F. For example, as shown in FIG. 2B, index node 202F stores search keys "Bob" and "Sam" and their respective location information (i.e., "b3" and "b4, respectively).

B. Hierarchical Index Structure Traversal for Search Key Retrieval

Referring again to FIG. 1, hierarchical index structure 110 is traversed for search keys responsive to receiving queries, for example, via client computing device 108. Due to the existence of orphan index nodes, as described above with reference to FIG. 3, the traversal of hierarchical index structure 110 does not follow a strict "move down" protocol, where the structure is traversed downward from a single root node, as is performed in classic tree-based indexes.

Figure 6:
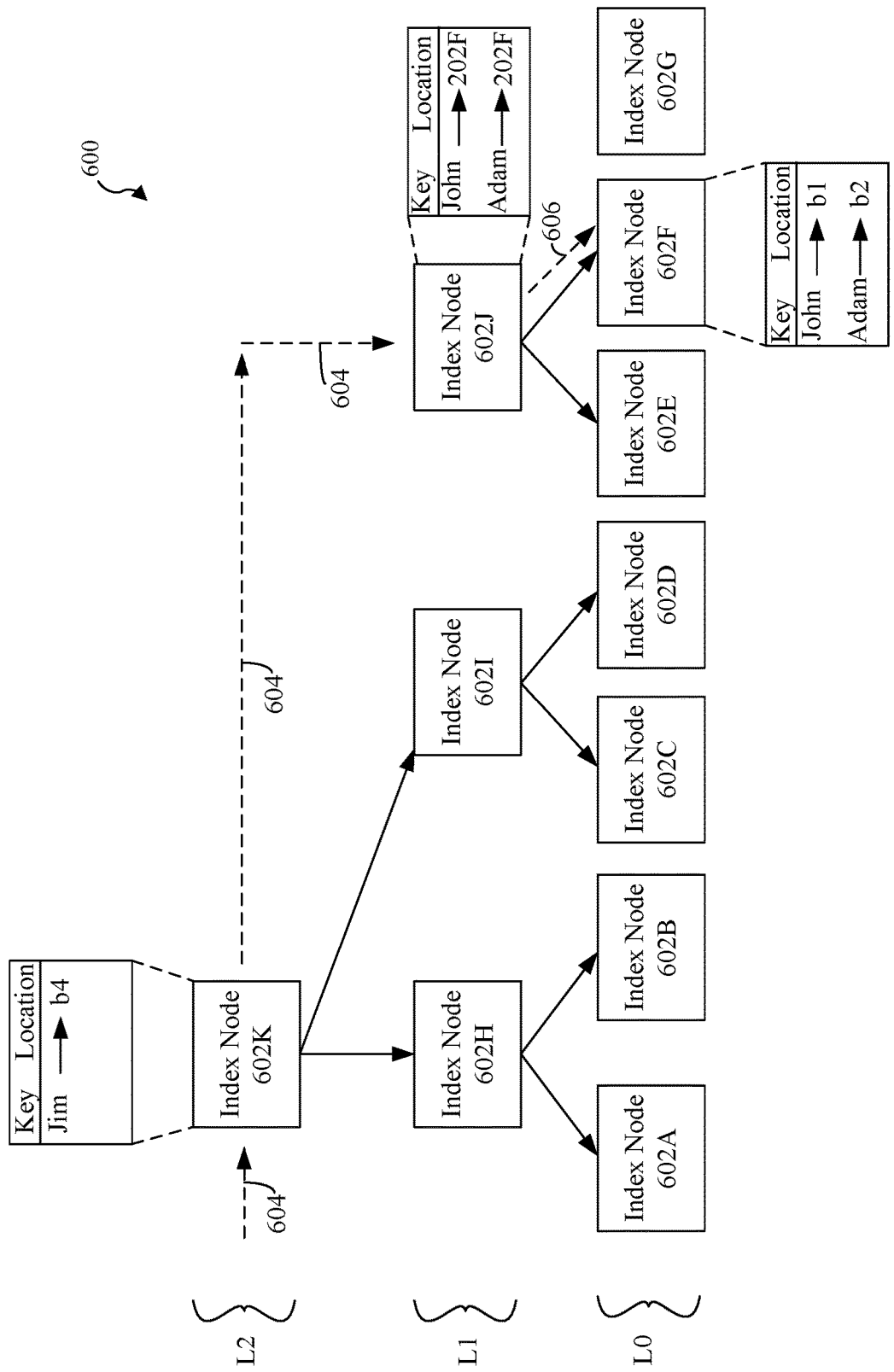
FIG. 6 depicts a hierarchical index structure in accordance with another example embodiment.

The hierarchical index structure traversal technique will now be described with reference to FIG. 6. FIG. 6 depicts a hierarchical index structure 600 in accordance with an example embodiment. Hierarchical index structure 600 comprises a plurality of levels (L0-L2). As shown in FIG. 6, hierarchical index structure 600 comprises a first level (L0) comprising index nodes 602A-602G, a second level (L1) comprising index nodes 602H-602J, and a third level (L2) comprising index node 602K.

When traversing hierarchical index structure 600, orphan index nodes (index nodes 602K, 602J, and 602G) are scanned level by level in a top-down manner. When scanning each index level, each orphan node at a particular level is searched for the search key(s) (or hashed version thereof) specified by the received query. For instance, with reference to FIG. 6, suppose a query specifies search key "John". In the example shown in FIG. 6, index node 602F comprises search key "John". To locate the search key, the index node located at the highest level (i.e. L2) is scanned first for the search key. For instance, with reference to FIG. 6, index node 602K is first scanned to determine whether index node 602K comprises the search key. Because index node 602K does not include the search key, the next orphan index node is scanned. The next orphan index node may be located at the same level or at lower level. In the example shown in FIG. 6, no other orphan index nodes exist at the highest level (i.e., L2). As such, the next level of hierarchical index structure 600 is searched for an orphan node. In the example shown in FIG. 6, level L1 includes orphan index node 602J. Accordingly, orphan index node 602J is scanned for the search key. In this example, search key "Jim" is found in orphan index node 602J. The orphan index node search described above is represented as dashed lines 604, where index node 602K is search first, followed by index node 602J. This type of search may be referred to as a "move right" operation, as the search moves rightward to the next orphan index node.

Once an orphan index node comprising the search key is found, the location information for that search key is determined. If the orphan index node is not a leaf index node, then the location information of the orphan index node references (i.e., points to) an index node located at a lower level of hierarchical index structure 600 that includes the search key. If the orphan index node is a leaf index node, then the location information specifies the location of the data block that contains the search key. In the example shown in FIG. 6, the location information associated with search key "John" specifies that index node 602F includes the search key. Accordingly, index node 602F is searched for the search key. As the search moves downward to the child index nodes of index node 602J (represented as dashed line 606), such a search operation is referred to as a "move down" operation.

After finding the search key in index node 602F, the location information associated therewith is determined. In the example shown in FIG. 6, the location information specifies the location of the data block that includes the search key, as index node 602F is a leaf index node. Responsive to determining the data block, one or more data records comprising the search key that are located at the corresponding data block is retrieved and returned to the user issuing the query.

It is noted that multiple orphan nodes may comprise the same search key. Accordingly, when traversing hierarchical index structure 600, each orphan index node may be scanned at each level of hierarchical index structure 600. Upon determination that a particular orphan index node comprises the search key, the search function executes the "move down" operation by recursively inquiring the child nodes pointed by the current index node being searched if the search key has been found within the current node.

As described above, users may issue hybrid queries in which both index nodes and data blocks that have not yet been indexed may be searched. This advantageously returns search keys representative of the latest view of the data received by backend server(s) 104. In contrast, when issuing standard queries, in which only index nodes are searched, search keys may be returned that are representative of a possibly stale version of the data.

To execute a hybrid query, query processor 122 queries progress log 124 to identify the data blocks that have been stored in file system 112, but have not yet been indexed. Query processor 122 traverses hierarchical index structure 110 to locate the search key specified by the hybrid query in the index nodes included therein and also searches the data blocks that have not yet been indexed, as identified via progress log 124. For instance, query processor 122 may perform a linear scan of each identified data block for the search key. The search keys found via traversal of hierarchical index structure 110 and found via linearly scanning the identified data blocks are provided to the user via a query response.

Figure 7:
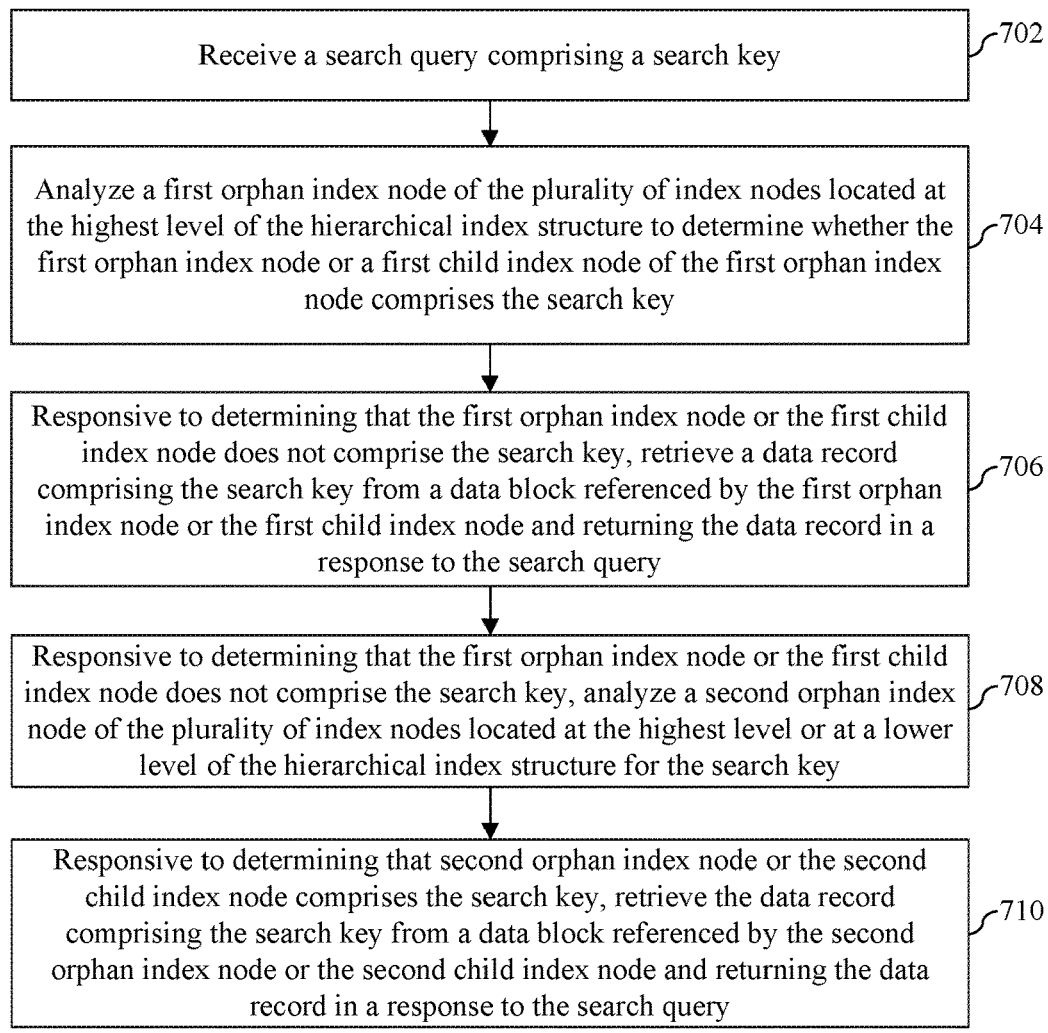
FIG. 7 shows a flowchart of a method for traversing a hierarchical index structure to locate search keys in accordance with an example embodiment.

Accordingly, search keys may be located via a hierarchical index structure in various ways. For example, FIG. 7 shows a flowchart 700 of a method for traversing a hierarchical index structure to locate search keys, according to an example embodiment. In an embodiment, flowchart 700 may be implemented by backend server(s) 800, as shown in FIG. 8. FIG. 8 is a block diagram of backend server(s) 800, according to an example embodiment. Backend server(s) 800 are examples of backend server(s) 104 and backend server(s) 500, as respectively described above with reference to FIGS. 1 and 5. As shown in FIG. 8, backend server(s) 800 comprises hierarchical index structure 810, index generator 818, file system 812, data storer 820, progress log 824, and query processor 822. Index structure 810, index generator 818, file system 812, data storer 820, progress log 824, and query processor 822 are examples of hierarchical index structure 110, index generator 118, file system 112, data storer 120, progress log 124, query processor 122, as described above with reference to FIG. 1, and examples of hierarchical index structure 510, index generator 518, file system 512, data storer 520, and progress log 524, as described above with reference to FIG. 5. Other structural and operational embodiments will be apparent to persons skilled in the relevant art(s) based on the following discussion regarding flowchart 700 and backend server(s) 800 of FIG. 8.

Flowchart 700 of FIG. 7 begins with step 702. In step 702, a search query comprising a search key is received. For example, with reference to FIG. 8, query processor receives a search query 802, for example, via API(s) 114, as described above with reference to FIG. 1. Responsive to receiving the search query, a hierarchical index structure comprising a plurality of index nodes is traversed for the search. Step 704, 706, 708, and 710 describe the traversal process in accordance with an example embodiment.

In step 704, a first orphan index node of the plurality of index nodes located at the highest level of the hierarchical index structure is analyzed to determine whether the first orphan index node or a first child index node of the first orphan index node comprises the search key. For example, with reference to FIG. 8, query processor 822 traverses hierarchical index structure 810 to locate and analyze a first orphan index node of the plurality of index nodes located at the highest level of hierarchical index structure 810 to determine whether the first orphan index node or a first child index node of the first orphan index node comprises the search key. For instance, with reference to FIG. 6, query processor 822 locates and analyzes index node 602K, as it is the orphan index node located at the highest level (L2) of hierarchical index structure 600. Query processor 822 analyzes 602K to determine whether index node 602K comprises the search key or whether index node 602K references a child node thereof (e.g., index nodes 602H or 602I) that comprises the search key.

In step 706, responsive to determining that first orphan index node or the first child index node comprises the search key, a data record comprising the search key is retrieved from a data block referenced by the first orphan index node or the first child index node. The data record is returned in a response to the search query. For example, with reference to FIG. 8, responsive to determining that first orphan index node or the first child index node comprises the search key, query processor 822 retrieves a data record comprising the search key from a data block referenced by the first orphan index node or the first child index node. The data block is stored in file system 812. Query processor 822 returns the data record in a query response 804. Query response 804 is provided to API(s) 114. User interface engine 116 causes the data record to be rendered via user interface 126.

In accordance with one or more embodiments, the data block is referenced by the first orphan index node or the first child index node via location information maintained by the first orphan index node or the first child index node. With reference to FIG. 6, if index node 602K comprises the search key, query processor 822 recursively searches through all its child index nodes until it locates the child node that comprises location information specifying the location of the data block that comprises the search key.

In accordance with one or more embodiments, the location information comprises a uniform resource identifier identifying at least one of a path to a file or an offset thereof at which the data block is stored.

In step 708, responsive to determining that the first orphan index node or the first child index node does not comprise the search key, a second orphan index node of the plurality of index nodes located at the highest level or at a lower level of the hierarchical index structure is analyzed for the search key. For example, with reference to FIG. 8, responsive to determining that the first orphan index node or the first child index node does not comprise the search key, query processor 822 locates and analyzes a second orphan index node of the plurality of index nodes located at the highest level or at a lower level of hierarchical index structure 810. For example, with reference to FIG. 6, if orphan index node 606K does not include the search key, query processor 822 locates another orphan index node at level L2. If none exist, as is the case in FIG. 6, query processor 822 searches for an orphan index node at the next highest level (i.e., L1). In the example shown in FIG. 6, index node 602J is next orphan index node that is analyzed for the search key.

In accordance with one or more embodiments, the first orphan index node and the second orphan index node are parentless. For example, with reference to FIG. 6, orphan index nodes 602K, 602J and 602G do not have any parent nodes that reference them, and therefore, are parentless.

In step 710, responsive to determining that second orphan index node or the second child index node comprises the search key, the data record comprising the search key is retrieved from a data block referenced by the second orphan index node or the second child index node and the data record is returned in a response to the search query. For example, with reference to FIG. 8, responsive to determining that second orphan index node or the second child index node comprises the search key, query processor 822 retrieves the data record comprising the search key from a data block referenced by the second orphan index node or the second child index node. The data block is stored in file system 812. The data record is returned in query response 804. With reference to FIG. 6, if index node 602J comprises the search key, query processor 822 recursively searches through all its child index nodes (i.e., index nodes 602E and 602F) until it locates the child node that comprises location information specifying the location of the data block that comprises the search key. If index node 602J does not comprise the search key, query processor 822 locates another orphan index node at level L1. If none exist, as is the case in FIG. 6, query processor 822 searches for an orphan index node at the next highest level (i.e., L0). In the example shown in FIG. 6, index node 602G would be the next orphan index node (located at L0) that is analyzed for the search key.

In accordance with one or more embodiments, a progress log is maintained that stores a first indication of each of the plurality of index nodes that have been generated for the hierarchical index structure. For example, with reference to FIG. 8, backend server(s) 800 maintain progress log 824 that stores a first indication of each of the plurality of index nodes (e.g., index nodes 602A-602K, as shown in FIG. 6) that have been generated for hierarchical index structure 810. Additional details regarding how progress log 824 is populated with such information is described above with reference to FIGS. 1, 4, and 5.

In accordance with one or more embodiments, the progress log further comprises a second indication of data blocks that have been stored in a file system but for which an index node has not yet been generated for the hierarchical index structure. For example, with reference to FIG. 8, progress log 824 further comprises a second indication of data blocks that have been stored in file system 812 but for which an index node has not yet been generated for hierarchical index structure 810. Additional details regarding how progress log 824 is populated with such information is described above with reference to FIGS. 1, 4, and 5.

In accordance with one or more embodiments, a hybrid query is executed such that both the index nodes of the hierarchical index structure and the data blocks that have not yet been indexed are searched for the search key. For example, a determination is made that at least one data block of the data blocks comprises the search key. The search key is retrieved from the at least one data block. The search key retrieved from the at least second data block is returned in the response to the search query. For example, with reference to FIG. 8, search query 802 may be a hybrid query that indicates that both the index nodes of hierarchical index structure 810 and the data blocks that have not yet been indexed (as indicated by progress log 824 and stored in file system 812) are to be searched for the search key. In such a case, query processor 822 searches through such data blocks for the search key. If the search key is found, the data record comprising the search key is returned in query response 804.

In accordance with one or more embodiments, a linear scan operation is performed on the data blocks to determine that at least one data block of the data blocks comprises the search key. For example, with reference to FIG. 8, query processor 822 performs a linear scan operation on the data blocks stored by file system 812 that have not yet been indexed to determine whether such data blocks comprise the search key.

III. Example Computer System Implementation

Client computing device 108, user interface 126, frontend server(s) 106, API(s) 114, user interface engine 116, backend server(s) 104, hierarchical index structure 110, index generator 118, file system 112, data storer 120, query processor 122, data sources 102A-102N, hierarchical index structure 200, hierarchical index structure 300, backend server(s) 500, hierarchical index structure 510, index generator 518, file system 512, data storer 520, hierarchical index structure 600, backend server(s) 800, hierarchical index structure 810, index generator 818, file system 812, data storer 850, and/or query processor 822 (and/or any of the components described therein), and/or flowcharts 400 and/or 700, may be implemented in hardware, or hardware combined with one or both of software and/or firmware. For example, client computing device 108, user interface 126, frontend server(s) 106, API(s) 114, user interface engine 116, backend server(s) 104, hierarchical index structure 110, index generator 118, file system 112, data storer 120, query processor 122, data sources 102A-102N, hierarchical index structure 200, hierarchical index structure 300, backend server(s) 500, hierarchical index structure 510, index generator 518, file system 512, data storer 520, hierarchical index structure 600, backend server(s) 800, hierarchical index structure 810, index generator 818, file system 812, data storer 850, and/or query processor 822 (and/or any of the components described therein), and/or flowcharts 400 and/or 700 may be implemented as computer program code/instructions configured to be executed in one or more processors and stored in a computer readable storage medium.

Alternatively, client computing device 108, user interface 126, frontend server(s) 106, API(s) 114, user interface engine 116, backend server(s) 104, hierarchical index structure 110, index generator 118, file system 112, data storer 120, query processor 122, data sources 102A-102N, hierarchical index structure 200, hierarchical index structure 300, backend server(s) 500, hierarchical index structure 510, index generator 518, file system 512, data storer 520, hierarchical index structure 600, backend server(s) 800, hierarchical index structure 810, index generator 818, file system 812, data storer 850, and/or query processor 822 (and/or any of the components described therein), and/or flowcharts 400 and/or 700 may be implemented as hardware logic/electrical circuitry.

For instance, in an embodiment, one or more, in any combination, of client computing device 108, user interface 126, frontend server(s) 106, API(s) 114, user interface engine 116, backend server(s) 104, hierarchical index structure 110, index generator 118, file system 112, data storer 120, query processor 122, data sources 102A-102N, hierarchical index structure 200, hierarchical index structure 300, backend server(s) 500, hierarchical index structure 510, index generator 518, file system 512, data storer 520, hierarchical index structure 600, backend server(s) 800, hierarchical index structure 810, index generator 818, file system 812, data storer 850, and/or query processor 822 (and/or any of the components described therein), and/or flowcharts 400 and/or 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

FIG. 9 depicts an exemplary implementation of a computing device 800 in which embodiments may be implemented. For example, client computing device 108, user interface 126, frontend server(s) 106, API(s) 114, user interface engine 116, backend server(s) 104, hierarchical index structure 110, index generator 118, file system 112, data storer 120, query processor 122, data sources 102A-102N, hierarchical index structure 200, hierarchical index structure 300, backend server(s) 500, hierarchical index structure 510, index generator 518, file system 512, data storer 520, hierarchical index structure 600, backend server(s) 800, hierarchical index structure 810, index generator 818, file system 812, data storer 850, and/or query processor 822 (and/or any of the components described therein), and/or flowcharts 400 and/or 700 may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing any of the features of client computing device 108, user interface 126, frontend server(s) 106, API(s) 114, user interface engine 116, backend server(s) 104, hierarchical index structure 110, index generator 118, file system 112, data storer 120, query processor 122, data sources 102A-102N, hierarchical index structure 200, hierarchical index structure 300, backend server(s) 500, hierarchical index structure 510, index generator 518, file system 512, data storer 520, hierarchical index structure 600, backend server(s) 800, hierarchical index structure 810, index generator 818, file system 812, data storer 850, and/or query processor 822 (and/or any of the components described therein), and/or flowcharts 400 and/or 700, and/or further embodiments described herein.

A user may enter commands and information into computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

III. Additional Exemplary Embodiments

A method is described herein. The method includes: receiving data from a plurality of different data sources; generating a plurality of first index nodes for the received data at a first level of a hierarchical index structure, each index node comprising a plurality of search keys corresponding to a subset of the received data and location information specifying a location at which each of the plurality of search keys is stored in a corresponding data block; and for each first subset of the first index nodes that comprise a number of duplicate search keys that exceed a first predetermined threshold, generating a second index node at a second level of the hierarchical index structure that comprises the duplicate search keys included in the first subset, the second index node pointing to each index node in the first subset of the first index nodes.

In one embodiment of the foregoing method, at least two index nodes of the plurality of first index nodes are merged.

In another embodiment of the foregoing method, said merging comprises: determining that the at least two index nodes of the plurality of first index nodes have a size below a second predetermined threshold; and merging the at least two index nodes responsive to determining that the at least two index nodes of the plurality of first index nodes have a size below the second predetermined threshold.

In yet another embodiment of the foregoing method, the location information comprises a uniform resource identifier identifying at least one of a path to a file or an offset thereof at which the corresponding data block is stored.

In a further embodiment of the foregoing method, the method further comprises maintaining a progress log that stores a first indication of each first index node that has been generated and a second indication of each second index node that has generated.

In yet another embodiment of the foregoing method, the progress log further comprises a third indication of data that has been received but for which a first index node has not yet been generated.

Another method is described herein. The method includes: receiving a search query comprising a search key; and traversing a hierarchical index structure comprising a plurality of index nodes for the search key, said traversing comprising: analyzing a first orphan index node of the plurality of index nodes located at the highest level of the hierarchical index structure to determine whether the first orphan index node or a first child index node of the first orphan index node comprises the search key; responsive to determining that first orphan index node or the first child index node comprises the search key, retrieving a data record comprising the search key from a data block referenced by the first orphan index node or the first child index node and returning the data record in a response to the search query; responsive to determining that the first orphan index node or the first child index node does not comprise the search key, analyzing a second orphan index node of the plurality of index nodes located at the highest level or at a lower level of the hierarchical index structure for the search key; and responsive to determining that second orphan index node or the second child index node comprises the search key, retrieving the data record comprising the search key from a data block referenced by the second orphan index node or the second child index node and returning the data record in a response to the search query.

In one embodiment of the foregoing method, the method further comprises: maintaining a progress log that stores a first indication of each of the plurality of index nodes that have been generated for the hierarchical index structure.

In another embodiment of the foregoing method, the progress log further comprises a second indication of data blocks that have been stored in a file system but for which an index node has not yet been generated for the hierarchical index structure.

In a further embodiment of the foregoing method, the method further comprises: determining that at least one data block of the data blocks comprises the search key; retrieving the search key from the at least one data block; and returning the search key retrieved from the at least one data block in the response to the search query.

In yet another embodiment of the foregoing method, said determining comprises: performing a linear scan operation on the data blocks.

In a further embodiment of the foregoing method, the data block is referenced by the first orphan index node or the first child index node via location information maintained by the first orphan index node or the first child index node.

In yet another embodiment of the foregoing method, the location information comprises a uniform resource identifier identifying at least one of a path to a file or an offset thereof at which the data block is stored.

In a further embodiment of the foregoing method, the first orphan index node and the second orphan index node are parentless.

A system comprising at least one processing circuit and at least one memory that stores program code configured to be executed by the at least one processor circuit is also described herein. The program code comprises: a query processor configured to: receive a search query comprising a search key; and traverse a hierarchical index structure comprising a plurality of index nodes for the search key by: analyzing a first orphan index node of the plurality of index nodes located at the highest level of the hierarchical index structure to determine whether the first orphan index node or a first child index node of the first orphan index node comprises the search key; responsive to determining that first orphan index node or the first child index node comprises the search key, retrieving a data record comprising the search key from a data block referenced by the first orphan index node or the first child index node and returning the data record in a response to the search query; responsive to determining that the first orphan index node or the first child index node does not comprise the search key, analyzing a second orphan index node of the plurality of index nodes located at the highest level or at a lower level of the hierarchical index structure for the search key; and responsive to determining that second orphan index node or the second child index node comprises the search key, retrieving the data record comprising the search key from a data block referenced by the second orphan index node or the second child index node and returning the data record in a response to the search query.

In one embodiment of the foregoing system, a progress log is maintained that stores a first indication of each of the plurality of index nodes that have been generated for the hierarchical index structure.

In another embodiment of the foregoing system, the progress log further comprises a second indication of data blocks that have been stored in a file system but for which an index node has not yet been generated for the hierarchical index structure.

In yet another embodiment of the foregoing system, the query processor is further configured to: determine that at least one data block of the data blocks comprises the search key; retrieve the search key from the at least one data block; and return the search key retrieved from the at least one data block in the response to the search query.

In still another embodiment of the foregoing system, the query processor determines that at least one data block of the data blocks comprises the search key by: performing a linear scan operation on the data blocks.

In a further embodiment of the foregoing system, the data block is referenced by the first orphan index node or the first child index node via location information maintained by the first orphan index node or the first child index node.

In still another embodiment of the foregoing system, the location information comprises a uniform resource identifier identifying at least one of a path to a file or an offset thereof at which the data block is stored.

IV. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method, comprising:
   receiving a search query comprising a search key; and
   traversing a hierarchical index structure comprising a plurality of index nodes for the search key, said traversing comprising:
      determining that a first orphan index node of the plurality of index nodes or a first child index node of the first orphan index node does not comprise the search key;
      responsive to determining that the first orphan index node or the first child index node does not comprise the search key, analyzing a second orphan index node of the plurality of index nodes located at the highest level or at a lower level of the hierarchical index structure for the search key; and responsive to determining that second orphan index node or a second child index node of the second orphan index node comprises the search key, retrieving the data record comprising the search key from a data block referenced by the second orphan index node or the second child index node and returning the data record in a response to the search query.

2. The method of claim 1, further comprising:
maintaining a progress log that stores a first indication of each of the plurality of index nodes that have been generated for the hierarchical index structure.

3. The method of claim 2, wherein the progress log further comprises a second indication of data blocks that have been stored in a file system but for which an index node has not yet been generated for the hierarchical index structure.

4. The method of claim 3, further comprising:
determining that at least one data block of the data blocks comprises the search key;
retrieving the search key from the at least one data block; and
returning the search key retrieved from the at least one data block in the response to the search query.

5. The method of claim 4, wherein said determining comprises:
performing a linear scan operation on the data blocks.

6. The method of claim 1, wherein the data block is referenced by the first orphan index node or the first child index node via location information maintained by the first orphan index node or the first child index node.

7. The method of claim 1, wherein the location information comprises a uniform resource identifier identifying at least one of a path to a file or an offset thereof at which the data block is stored.

8. The method of claim 1, wherein the first orphan index node and the second orphan index node are parentless.

9. A system, comprising:
at least one processor circuit; and
at least one memory that stores program code configured to be executed by the at least one processor circuit, the program code comprising:
a query processor configured to:
receive a search query comprising a search key; and
traverse a hierarchical index structure comprising a plurality of index nodes for the search key by:
analyzing a first orphan index node of the plurality of index nodes located at the highest level of the hierarchical index structure to determine whether the first orphan index node or a first child index node of the first orphan index node comprises the search key;
responsive to determining that first orphan index node or the first child index node comprises the search key, retrieving a data record comprising the search key from a data block referenced by the first orphan index node or the first child index node and returning the data record in a response to the search query;
responsive to determining that the first orphan index node or the first child index node does not comprise the search key, analyzing a second orphan index node of the plurality of index nodes located at the highest level or at a lower level of the hierarchical index structure for the search key; and
responsive to determining that second orphan index node or the second child index node comprises the search key, retrieving the data record comprising the search key from a data block referenced by the second orphan index node or the second child index node and returning the data record in a response to the search query.

10. The system of claim 9, wherein a progress log is maintained that stores a first indication of each of the plurality of index nodes that have been generated for the hierarchical index structure.

11. The system of claim 10, wherein the progress log further comprises a second indication of data blocks that have been stored in a file system but for which an index node has not yet been generated for the hierarchical index structure.

12. The system of claim 11, wherein the query processor is further configured to:
determine that at least one data block of the data blocks comprises the search key;
retrieve the search key from the at least one data block; and
return the search key retrieved from the at least one data block in the response to the search query.

13. The system of claim 12, wherein the query processor determines that at least one data block of the data blocks comprises the search key by:
performing a linear scan operation on the data blocks.

14. The system of claim 9, wherein the data block is referenced by the first orphan index node or the first child index node via location information maintained by the first orphan index node or the first child index node.

15. A computer-readable storage medium having program instructions recorded thereon that, when executed by at least one processor, perform a method comprising:
receiving a search query comprising a search key; and
traversing a hierarchical index structure comprising a plurality of index nodes for the search key, said traversing comprising:
determining that a first orphan index node of the plurality of index nodes or a first child index node of the first orphan index node does not comprise the search key;
responsive to determining that the first orphan index node or the first child index node does not comprise the search key, analyzing a second orphan index node of the plurality of index nodes located at the highest level or at a lower level of the hierarchical index structure for the search key; and
responsive to determining that second orphan index node or a second child index node of the second orphan index node comprises the search key, retrieving the data record comprising the search key from a data block referenced by the second orphan index node or the second child index node and returning the data record in a response to the search query.

16. The computer-readable storage medium of claim 15, the method further comprising:
maintaining a progress log that stores a first indication of each of the plurality of index nodes that have been generated for the hierarchical index structure.

17. The computer-readable storage medium of claim 16, wherein the progress log further comprises a second indication of data blocks that have been stored in a file system but for which an index node has not yet been generated for the hierarchical index structure.

18. The computer-readable storage medium of claim 17, the method further comprising:
- determining that at least one data block of the data blocks comprises the search key;
- retrieving the search key from the at least one data block; and
- returning the search key retrieved from the at least one data block in the response to the search query.

19. The computer-readable storage medium of claim 18, wherein said determining comprises:
- performing a linear scan operation on the data blocks.

20. The computer-readable storage medium of claim 15, wherein the data block is referenced by the first orphan index node or the first child index node via location information maintained by the first orphan index node or the first child index node.

* * * * *